United States Patent [19]

Mochizuki

[11] 4,259,711

[45] Mar. 31, 1981

[54] SLIT ILLUMINATING DEVICE

[75] Inventor: Noritaka Mochizuki, Yokohama, Japan

[73] Assignee: Canon Kabushiki Kaisha, Tokyo, Japan

[21] Appl. No.: 25,081

[22] Filed: Mar. 29, 1979

[30] Foreign Application Priority Data

Apr. 7, 1978 [JP] Japan .................................. 53/41026

[51] Int. Cl.[3] .......................... F21V 7/00; G03B 27/54

[52] U.S. Cl. .................................... 362/304; 362/302; 362/305; 362/346; 355/67

[58] Field of Search ............... 362/302, 304, 305, 346, 362/347, 349; 355/49, 51, 66, 71, 8, 67

[56] References Cited

U.S. PATENT DOCUMENTS

| | | | |
|---|---|---|---|
| 3,364,816 | 1/1968 | Jeffree | 355/51 |
| 3,532,424 | 10/1970 | Miles | 362/346 |
| 3,670,157 | 6/1972 | Bragg | 362/346 |
| 3,982,116 | 9/1976 | Sakuma | 362/304 |
| 4,080,064 | 3/1978 | Komori | 355/51 |
| 4,173,411 | 11/1979 | Massengeil | 355/51 |

OTHER PUBLICATIONS

Williams, G. T., IBM Tech. Disclosure Bulletin, vol. 14, No. 11, Apr. 1972, pp. 3320-3321.

Bersot et al., IBM Tech. Disclosure Bulletin, vol. 15, No. 2, Jul. 1972, p. 521.

Williams, G. T., IBM Tech. Disclosure Bulletin, vol. 15, No. 2, Jul. 1972, p. 522.

*Primary Examiner*—Donald P. Walsh

*Attorney, Agent, or Firm*—Fitzpatrick, Cella, Harper & Scinto

[57] ABSTRACT

A compact slit illuminating device for use in a copier or the like, wherein a part of the reflecting surface of the upper reflector, partially encircling a light source, is provided with a function which is the same as that of a lower reflector, to achieve a uniform light distribution over the slit, wherein such reflectors are suitable for use in combination with a compound eye lens of a short conjugate length.

8 Claims, 1 Drawing Figure

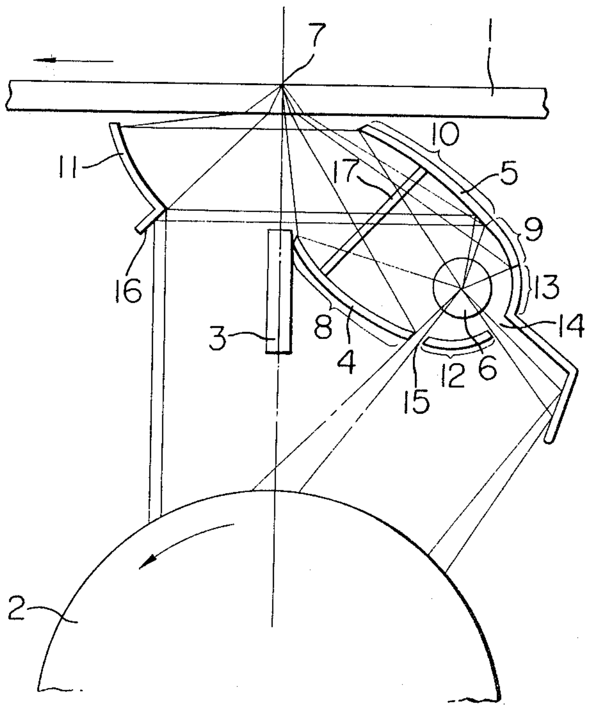
7
1
10
11
17
5
9
16
13
14
3
8
4
12
6
15
2

SLIT ILLUMINATING DEVICE

BACKGROUND OF THE INVENTION

The present invention relates to a slit illuminating device adapted for use in the illumination of an exposure slit in a copier or the like.

Conventional slit illuminating devices comprising a tubular light source encircled by a reflector having a cylindrical reflecting surface of a conicoidal section are already disclosed for example in the U.S. Pat. Nos. 3,364,816 and 3,982,116; Japanese Patents Laid-Open Sho No. 50-61233, Sho No. 51-23725 and Sho No. 52-126241; and IBM Technical Disclosure Bulletins, Vol. 14, No. 11, April 1972, p. 3320, and Vol. 15, No. 2, July 1972, p.521-523.

Also, it is known that a compact copying apparatus can be obtained by employing, as the imaging system thereof, an imaging element array of a short focal length composed for example lenses of an axial length larger than the effective diameter thereof (hereinafter called bar lenses) as disclosed in the Japanese Patent Laid-Open Sho No. 53-122426 or of converging optical fibers for example known under the trade name of Selfoc wherein the refractive index decreases parabolically in the radial direction from the center thereof as disclosed in the Japanese Patents Laid-Open Sho No. 47-28057 and Sho No. 47-28058.

The present invention relates to an improvement in such conventional slit illuminating devices, the improvement being featured in that, in order to compensate for the reduction in size of a lower reflector resulting from the positional restriction of the imaging element array of a short focal length, in case of use of such array as the imaging system, a part of the upper reflector is provided with a function which is the same as that of the lower reflector thereby balancing the amounts of light illuminating the slit from the lower lateral directions thereof.

SUMMARY OF THE INVENTION

The object of the present invention is to provide a compact slit illuminating device capable of achieving a uniform light distribution over the entire slit and thus adapted for use in combination with an imaging element array of a short focal length.

The above-mentioned object is achieved according to the present invention by a structure comprising a lower reflector which partially encircles the light source, an upper reflector of which a part of the reflecting surface performs a function which is the same as that of said lower reflector while the remaining part of said reflecting surface functions to direct the light beam from the light source in a direction parallel to the slit plane, and a third reflector, positioned opposite to said light source with respect to the slit, for directing the light beam from said upper reflector toward the slit.

BRIEF DESCRIPTION OF THE DRAWINGS

The attached drawing is a view showing the optical arrangement of the slit illuminating device of the present invention applied to a copying apparatus.

DESCRIPTION OF THE PREFERRED EMBODIMENTS

Now the present invention will be clarified in detail by the following description taken in conjunction with the attached drawing, in which there are shown a transparent original table for supporting an original thereon and for being displaced reciprocably in the direction indicated by the arrow, a photosensitive drum 2 rotated in the direction indicated by the arrow, and a fixed imaging lens 3 constituting an erecting imaging system and thus forming a mirror image of the original on said photosensitive drum. Said imaging lens 3 is a compound eye lens composed of a plurality of bar lenses or of Selfoc fibers linearly arranged in a direction perpendicular to the plane of the drawing. In comparison with the ordinary single lens system, such compound eye lens is advantageous in that it allows a reduced conjugate length, or, a reduction in the distance between the original table and the photosensitive drum, thereby enabling a more compact arrangement of the entire copying apparatus. In response to the compactization of the projection system there will be required a reduction in the dimension of other systems, which will be rendered possible by the present invention. In order to compactize the illuminating device it has to be located close to the compound eye lens 3 as shown in FIG. 1. In this case the dimension of the lower reflector, being defined by the compound eye lens 3, can only be reduced to a certain limit. Although this limitation can be resolved to a certain extent by rendering the lower reflector smaller than the upper reflector as shown in FIG. 1, the illumination of the slit by the lower reflector will become weaker than that by the upper reflector, thus resulting in an unbalanced illumination in case the light from a reflector is introduced to the slit symmetrically with the light from the other reflector as in the aforementioned conventional illuminating devices. In the illuminating device of the present invention, however, this drawback can be avoided by a fact that the light from a part of the reflecting surface of the upper reflector is introduced to the slit from the same direction as that of the light from the lower reflector.

Referring to FIG. 1, the lower reflector 4 provided in facing relationship to the original table 1 is made smaller than the other upper reflector 5, and is provided with a cylindrical reflecting surface 8 of an elliptic section having the first focal point in a position substantially coinciding with the central axis of a tubular lamp 6 and the second focal point in a position substantially coinciding, in consideration of the refraction inside said transparent original table, with the slit 7 to be illuminated. On the other hand said upper reflector 5 is provided with a cylindrical reflecting surface 9 of an elliptic section having the first focal point in a position substantially coinciding with the central axis of said tubular lamp 6 and the second focal point in a position substantially coinciding with said slit 7, and a cylindrical reflecting surface 10 of a parabolic section having the focal point in a position substantially coinciding with the central axis of said tubular lamp 6 for reflecting the light from said lamp 6 in a direction parallel to the original table 1 in a state of a parallel beam. There is also provided a third mirror 11 of a cylindrical reflecting surface having the focal point at the slit 7 to be illuminated, whereby the parallel beam from said cylindrical parabolic mirror 10 is focused on said slit-shaped portion 7. It is therefore rendered possible to balance the amount of illuminating light from the left with that from the right by suitably adjusting the dimensions of the cylindrical elliptic reflecting surfaces even when the lower reflector 4 has to be made smaller in order to position the illuminating device closer to the compound eye lens 3. Also there are shown auxiliary mirrors 12 and 13 provided with cylindrical reflecting surfaces having the center of curvature at the central axis of said tubular lamp 6 to reflect the light therefrom toward the center of said lamp 6. The light emerging from a rear slit 14 is guided by a mirror to the pre-exposure position of the photosensitive drum, while the light through a slit 15 is utilized for the blank exposure of said drum. Also a part of the parallel light beam from said parabolic mirror is directed, by means of a mirror 16 provided integrally with the cylindrical mirror 11, to the flush exposure position on said drum. 17 is an infrared absorption filter.

The reflecting surface 9, which constitutes a cylindrical elliptic surface, may also be composed of a cylindrical parabolic mirror. In this case the slit-shaped area 7 is illuminated with a parallel beam if the central axis of the lamp 6 is placed at the focal point of said parabolic section, or, if such illumination is not desirable, with a converging beam if the lamp 6 is displaced from said focal point. Also the above-mentioned reflecting surfaces 4, 12, 13, 9, 10 and 11 may be composed of a plurality of strips in such a manner that the envelope of said strips constitutes the above-mentioned conicoidal section. Furthermore said reflecting surfaces may be subjected to a diffusion treatment to provide a slight diffusing function to illuminate the slit area more broadly, or may be provided with an infrared reflecting layer.

As explained in the foregoing it is rendered possible by the present invention to obtain a compact slit illuminating device adapted for use in a copier or the like utilizing a compound eye lens with a short conjugate length as the imaging system.

What I claim is:

1. A slit illuminating device comprising:

a tubular light source;

a first reflector means of a conicoidal surface having the generation lines parallel to the center of said light source, said reflector means being provided so as to partially encircle said light source and to directly illuminate a slit area for illuminating an original to be copied, said first reflector means being disposed below a principal axis connecting the light source and the slit area;

a second reflector means shaped in such a manner that a part of the reflecting surface thereof directly illuminates the slit area in the same manner as the first reflector means and that the remaining part of the reflecting surface directs the reflected light substantially parallel to the plane of the original, said second reflector means being disposed above the principal axis connecting said light source and the slit area; and a third reflector means positioned on the side of the slit area opposite to that of said first and second reflector means and adapted to reflect the light from said second reflector means toward said slit area so as to illuminate said area from a direction symmetrical to that of the direct illumination by said first and second reflectors as measured from a line passing through said slit area normal to the plane of the original.

2. A slit illuminating device according to claim 1, wherein said first reflector is a cylindrical elliptic mirror having its first focal point at the center of said light source and its second focal point at a position substantially coinciding with said slit area.

3. A slit illuminating device according to claim 1, wherein the partial reflecting surface of said second reflector means for directly illuminating the slit area, is a cylindrical elliptic mirror having its second focal point at a position substantially coinciding with the position of said slit area.

4. A slit illuminating device according to claim 1, wherein the partial reflecting surface of said second reflector means for directly illuminating the slit area, is a cylindrical parabolic mirror.

5. A slit illuminating device according to claim 4, wherein the partial reflecting surface of said second reflector means for forming a reflected light beam parallel to the plane of the original, is a cylindrical parabolic mirror having its focal point at the center of said light source, and said third mirror is a cylindrical parabolic mirror having its focal point at a position substantially coinciding with said slit area.

6. A slit illuminating device according to claim 1, wherein said first and second reflector means are respectively composed of a plurality of planar mirrors, and wherein an envelope surface connecting the centers of said planar mirrors constitutes the above-mentioned conicoidal surface.

7. A slit illuminating device according to claim 1, wherein said first and second reflector means are respectively subjected to a diffusion treatment to cause the light reflected thereby to be diffused.

8. A slit illuminating device according to claim 1, further comprising an infrared absorption filter positioned at an aperture between said first and second reflector means.

* * * * *